United States Patent
Ramler et al.

(10) Patent No.: US 10,920,901 B2
(45) Date of Patent: Feb. 16, 2021

(54) ELECTROMAGNETIC VALVE

(71) Applicants: Andreas Stihl AG & Co. KG, Waiblingen (DE); Staiger GmbH & Co. KG, Erligheim (DE)

(72) Inventors: Jens Peter Ramler, Backnang (DE); Patrick Levien, Ebersbach (DE); Patrick Schlauch, Esslingen (DE); Peter Kofink, Obersulm (DE); Wolfgang Layher, Besigheim (DE); Bruno Staiger, Bönnigheim (DE); Marc Staiger, Ludwigsburg (DE); Stefan Waldinsperger, Freudental (DE); Marcus Wieduwilt, Mühlacker-Großglattbach (DE)

(73) Assignees: Andreas Stihl AG & Co. KG, Waiblingen (DE); Staiger GmbH & Co. KG, Erligheim (DE)

( * ) Notice: Subject to any disclaimer, the term of this patent is extended or adjusted under 35 U.S.C. 154(b) by 0 days.

(21) Appl. No.: 16/479,245

(22) PCT Filed: Jan. 18, 2018

(86) PCT No.: PCT/EP2018/051215
§ 371 (c)(1),
(2) Date: Jul. 19, 2019

(87) PCT Pub. No.: WO2018/134306
PCT Pub. Date: Jul. 26, 2018

(65) Prior Publication Data
US 2019/0383415 A1 Dec. 19, 2019

(30) Foreign Application Priority Data

Jan. 19, 2017 (DE) .......................... 10 2017 000 445
Aug. 29, 2017 (EP) ..................................... 17001447

(51) Int. Cl.
F16K 31/06 (2006.01)
F16K 1/42 (2006.01)
F16K 1/44 (2006.01)

(52) U.S. Cl.
CPC ............ *F16K 31/0658* (2013.01); *F16K 1/42* (2013.01); *F16K 1/44* (2013.01)

(58) Field of Classification Search
CPC ........... F16K 31/0658; F16K 1/42; F16K 1/44
(Continued)

(56) References Cited

U.S. PATENT DOCUMENTS 2,261,562 A * 11/1941 Ray ...................... F16K 31/0658
251/129.16
2,294,421 A * 9/1942 Ray ...................... F16K 31/0658
251/129.16
(Continued)

FOREIGN PATENT DOCUMENTS

CN 102712306 10/2012
CN 203604769 5/2014
(Continued)

*Primary Examiner* — John Bastianelli
(74) *Attorney, Agent, or Firm* — Gudrun E. Huckett

(57) ABSTRACT

The invention relates to an electromagnetic valve having a valve housing (2) and a valve opening (29) with a valve seat (8) and an electric drive coil (3) and a magnetic yoke (11) and a longitudinal centre axis (14). The magnetic yoke (11) is assigned a metallic plate armature (5) which is mounted movably and has an armature disc (48). The armature disc (48) lies sealingly with a sealing surface (9) against the valve seat (8) in a first switching position of the valve, and opens the valve seat (8) in a second switching position of the valve. According to the invention, the valve seat (8) is configured on a valve component (18), wherein the valve component (18) has at least one valve opening (29) which lies at a radial spacing (r) from the longitudinal centre axis (14). The valve seat (8) of the valve opening (29), which valve seat (8)
(Continued)

corresponds with direct body contact with the sealing surface (9) of the armature disc (48) of the plate armature (7), consists of metal.

15 Claims, 9 Drawing Sheets

(58) Field of Classification Search
USPC .................................... 251/129.16, 333, 360
See application file for complete search history.

(56) References Cited

U.S. PATENT DOCUMENTS

| | | | | |
|---|---|---|---|---|
| 2,374,895 A | * | 5/1945 | Ray | F16K 31/0658 251/129.16 |
| 2,589,574 A | * | 3/1952 | Ray | F16K 31/0658 251/129.16 |
| 3,960,361 A | * | 6/1976 | York | F16K 31/0606 251/129.16 |
| 4,409,638 A | * | 10/1983 | Sturman | H01H 47/226 251/129.16 |
| 4,941,447 A | * | 7/1990 | Mannhardt | F02M 51/02 123/455 |
| 5,163,623 A | * | 11/1992 | Seino | F02M 51/0639 239/585.3 |
| 2005/0168310 A1 | | 8/2005 | Nickel et al. | |
| 2013/0207015 A1 | | 8/2013 | Vier et al. | |

FOREIGN PATENT DOCUMENTS

| | | |
|---|---|---|
| DE | 21 60 262 | 6/1973 |
| DE | 102 42 816 | 3/2004 |
| DE | 10 2007 005 915 | 8/2008 |
| DE | 10 2014 208 397 | 11/2015 |
| DE | 10 2015 212 475 | 1/2017 |
| DE | 10 2015 212 476 | 1/2017 |
| EP | 0 919 755 | 6/1999 |

\* cited by examiner

ELECTROMAGNETIC VALVE

BACKGROUND OF THE INVENTION

The invention concerns an electromagnetic valve with a valve housing, with at least one valve opening with a valve seat, as well as with a magnetic circuit with an electric drive coil and a magnetic yoke with a longitudinal center axis, and with a metallic plate armature with an armature disc interacting with the yoke. The armature disc is movably supported relative to the yoke, wherein the armature disc is seal-tightly contacting a sealing surface at the valve seat in a first switching position of the valve and opens the valve seat in a second switching position.

In well-tried valves of this type, important components such as housing, valve body, and valve seat are made of plastic material. In this context, it cannot be ruled out that, in particular at extreme environmental conditions and high valve switching frequency, wear and/or deformations will occur, for example, in the region of the valve seat, and lead to functional impairments.

DE 102 42 816 B4 discloses an electromagnetic valve. The valve comprises a coil in which an iron core of a magnetic yoke is arranged. The yoke and the coil are enclosed by a plastic housing. When current flows in the coil, a plate armature is attracted in the direction toward the yoke against a spring force. In this context, the plate armature contacts a contact surface which is formed at the plastic housing and switches valve seats of flow channels extending through the plastic housing. Depending on the controlled fluid, the valve seats formed in the plastic housing tend to wear. The wear may occur due to mineral particles in the fluid that act abrasively. Also, the particles can deposit within the valve seats of the plastic housing which may lead to leakage of the electromagnetic valve.

The invention has the object to further develop a valve of the aforementioned kind such that the afore described disadvantages are avoided and a high valve seat resistance as well as a permanent operational reliability is obtained with simple means.

SUMMARY OF THE INVENTION

This object is solved according to the invention in that the valve seat, which corresponds with direct body contact with the sealing surface of the armature disc of the plate armature, is comprised of metal.

The valve seat is embodied at a valve component with at least one valve opening wherein the valve opening is positioned at a radial spacing relative to the longitudinal center axis. The spacing is measured from the longitudinal center axis to the center, in particular to the center of the opening of the valve opening. Due to the embodiment of the valve seat of metal, it is ensured that the valve seat is particularly resistant to wear. A deposition of particles in the valve seat can be prevented. Also, a long-term wear by abrasive particles can be avoided. Due to the metallic contact of the sealing surface of the armature disc with the metallic valve seat, it is moreover ensured that particles that deposit from the fluid are displaced so that the seal-tightness of the valve is achieved for a long operating period.

It is advantageously provided that the valve component is comprised at least partially, in particular completely, of a metal and/or a metal alloy. The metal of the valve component can be in particular magnetic.

The valve component is arranged such at the valve housing that it is in contact with the fluid in regions with increased erosion load. Accordingly, the valve component is arranged in regions of the electromagnetic valve where increased wear occurs. Due to the targeted selection of the material of the valve component, in particular the targeted selection of the material pair of the valve component and of the metallic plate armature, the electromagnetic valve can be matched specifically to a fluid to be controlled. Since only the material of the valve component is to be adapted when producing the electromagnetic valve, the material of the valve housing can be retained. In this way, the wear can be reduced in a simple way in regions with increased erosion load without affecting the flow properties in this context. In particular, a an improvement of the flow properties of the fluid can be achieved also.

Since the valve seat consists of metal and the sealing surface of the plate armature consists of metal and/or of a metal alloy, the wear of the valve seat and of the contacting sealing surface is reduced significantly relative to an embodiment of plastic material. Accordingly, the service life of the electromagnetic valve is increased. Also, a good sealing action between the valve seat at the valve component and the sealing surface of the metallic plate armature can be achieved for a long operating duration of the electromagnetic valve. Advantageously, the valve seat adapts to the sealing surface of the metallic plate armature. In this way, the sealing action of the electromagnetic valve can even increase after an extended operating duration.

Advantageously, the valve component is embodied as a ring element. The valve opening with the valve seat is embodied advantageously in the ring element. The ring element may comprise a first end face which is at least partially in contact with the yoke.

Advantageously, the valve seat is embodied as a raised rim of the valve opening embodied at the valve component. The raised rim can be configured like a shoulder or a landing. The rim surrounds the valve opening completely. In this way, better sealing properties between the sealing surface of the valve seat and the metallic plate armature can be achieved. By embodying the valve seat as a raised rim, the sealing plane of the valve seat projects relative to the remaining surface of the end face of the ring element toward the plate armature. Advantageously, the sealing plane of the valve seat is spaced apart from the remaining surface of the valve component. When the plate armature is contacting the raised rim of the valve seat, the remaining surface of the end face of the plate armature is not in contact with the valve component. In this way, a residual air gap between the valve component and the metallic plate armature is produced. Since no areal contact between the metallic plate armature and the remaining surface of the valve component is produced, it is also possible to avoid greater adhesion forces. Great adhesion forces would impair release of the plate armature from the valve component and the functional reliability of the valve.

The surface area of the valve seat is minimal relative to the surface area of the second end face. The surface area of the valve seat amounts to less than 10% of the surface area of the second end face. Due to the minimal surface area of the valve seat, the surface pressure upon contact between the valve seat and the plate armature is high so that a good sealing action is possible.

In a further embodiment of the invention, the valve component is designed as a frame element. The frame element is comprised advantageously of an in particular central circular ring. The frame element comprises at least one metal frame surrounding the valve opening. The surrounding metal frame forms advantageously the valve seat.

Due to the embodiment of a metal frame, the material expenditure is reduced so that the frame element which is comprised of metal or of a metal alloy has, for example, only a minimal effect on the magnetic field of the drive unit of the valve.

The magnetic yoke of the drive unit of the valve comprises advantageously an outer cylinder with an inner core. A cylinder wall of the outer cylinder comprises an inner diameter circle. The valve opening is positioned advantageously on the inner diameter circle. Such an arrangement is advantageous for embodying the flow connection to the valve opening.

Advantageously, the valve component or the ring element is connected with form fit to the yoke. In this way, the magnetic field between the yoke and the valve component can be promoted. Due to a disturbance-free magnetic field, the attractive forces between the ring element and the metallic plate armature can be reinforced. This can lead to a reduced size of the components and thus to a valve of smaller size. Due to the form-fit connection between the valve component or the ring element and the yoke, the valve component is held safely even at high load.

The magnetic yoke of the drive unit of the valve is comprised of an outer core and an inner core. Advantageously, the outer core is embodied as an outer cylinder. The inner core has preferably the configuration of a solid cylinder. The inner core is expediently surrounded by the outer cylinder. The valve component is advantageously arranged in the annular space between the inner core and the cylinder wall of the outer cylinder. In particular, the valve component engages preferably with an in particular radial fastening section in at least one cutout of the cylinder wall of the outer cylinder. The valve component is advantageously held rotationally fixed with form fit in the cutout of the cylinder wall of the outer cylinder. For easy accessibility of the valve opening, it is provided that the valve opening is locally positioned in the cutout of the cylinder wall of the outer cylinder.

Advantageously, the valve component which is embodied in particular as a ring element or frame part is held at the valve housing. The valve component can be embodied in particular as an insertion part wherein the insertion part is embedded by casting in the material of the valve housing, advantageously by injection molding. In this way, additional components for fastening the ring element are avoided so that the manufacture of the electromagnetic valve is simplified and a reduction of the installation space is achieved. Advantageously, the valve component can also be glued or welded to the yoke. Expediently, the valve component is embedded with form fit seal-tightly in a plastic material. The plastic material can be the same as the one of which the valve housing is comprised. The plastic material fills in particular the free annular space between the inner core and the outer cylinder.

The first switching position of the electromagnetic valve can be the switching position in which the electric drive coil is not energized. The electromagnetic valve is expediently a valve that is open when currentless. The first position in case of a valve open when currentless means that the valve seat of the valve component is not interacting seal-tightly with the sealing surface of the metallic plate armature. Accordingly, in case of a valve open when currentless, a fluid connection between the at least one first flow channel with the valve opening and the at least one second flow channel with the outlet exists in the first switching position. The fluid in the first switching position can flow from the first flow channel through the valve housing and through the ring element via the valve chamber into the second flow channel. In order to achieve a larger flow cross section, advantageously a plurality of first flow channels and valve openings and/or a plurality of second flow channels are provided which are connected in fluid communication with each other via the valve chamber. In particular, the valve component comprises more than one valve opening and more than one valve seat. The valve seats are positioned preferably in circumferential direction about the longitudinal center axis at a spacing relative to each other. In particular, a plurality of valve seats are arranged in a common plane.

In a second switching position of the electromagnetic valve, the electric drive coil is energized. In this way, a magnetic field is acting which pulls the metallic plate armature in the direction toward the valve component. The sealing surface of the metallic plate armature interacts seal-tightly with the valve seat. The metallic plate armature blocks the fluid connection of the valve opening of the first flow channel and of the second flow channel to the outlet of the valve. In the second switching position of the electromagnetic valve, conveyance of the fluid is interrupted or blocked.

The valve component with the valve seat is comprised in particular of a magnetizable metal. In this way, the valve component becomes part of the magnetic circuit of the yoke whereby magnetic losses can be minimized.

It can be expedient to embody the valve component of a non-magnetic metal, in particular of stainless steel. The valve component in this case does not become part of the magnetic circuit, which may be advantageous in an individual case.

In a particular embodiment of the invention, the valve component is embodied together with the valve seat as a structural unit made by a stamping/bending method. By this manufacturing process, in particular the rim which forms the valve seat can be integrally formed in a simple way.

Expediently, the valve component comprises a central opening, wherein in the valve housing a spacing is present between a boundary wall of the opening and a circumferential surface of an inner core of the yoke. The spacing is filled expediently with a non-magnetizable material so that a magnetic short circuit is reliably prevented.

In a particular manner, the valve opening and the valve seat are embodied in a rectangular shape with rounded corner regions. In this way, a large valve opening can be provided in a ring element so that the flow of a fluid is promoted.

It is advantageously provided to load the plate armature in the direction of a switching position with the spring force of a valve spring. This switching position can be the first switching position. Advantageously, a spring is acting on the plate armature which forces the plate armature back into the first switching position after deactivation of current flow in the electric drive coil. In this way, short switching times of the electromagnetic valve are possible.

BRIEF DESCRIPTION OF THE DRAWINGS

Further advantages and important details of the invention can be taken from the additional claims, the drawings, and the following description of embodiments of the invention. It is shown in:

DESCRIPTION OF PREFERRED EMBODIMENTS

Figure 1:
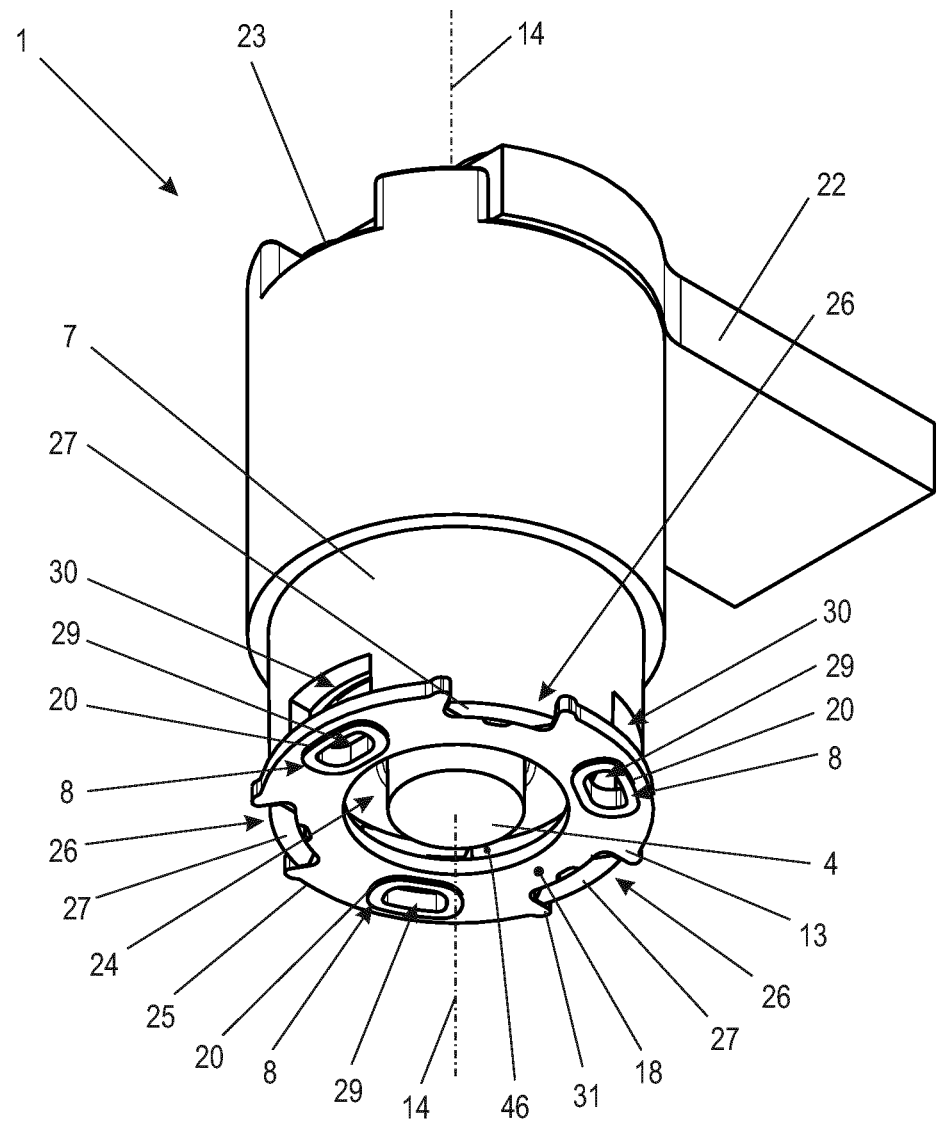
FIG. 1 a perspective illustration of an electromagnetic valve without valve housing and metallic plate armature.
Figure 2:
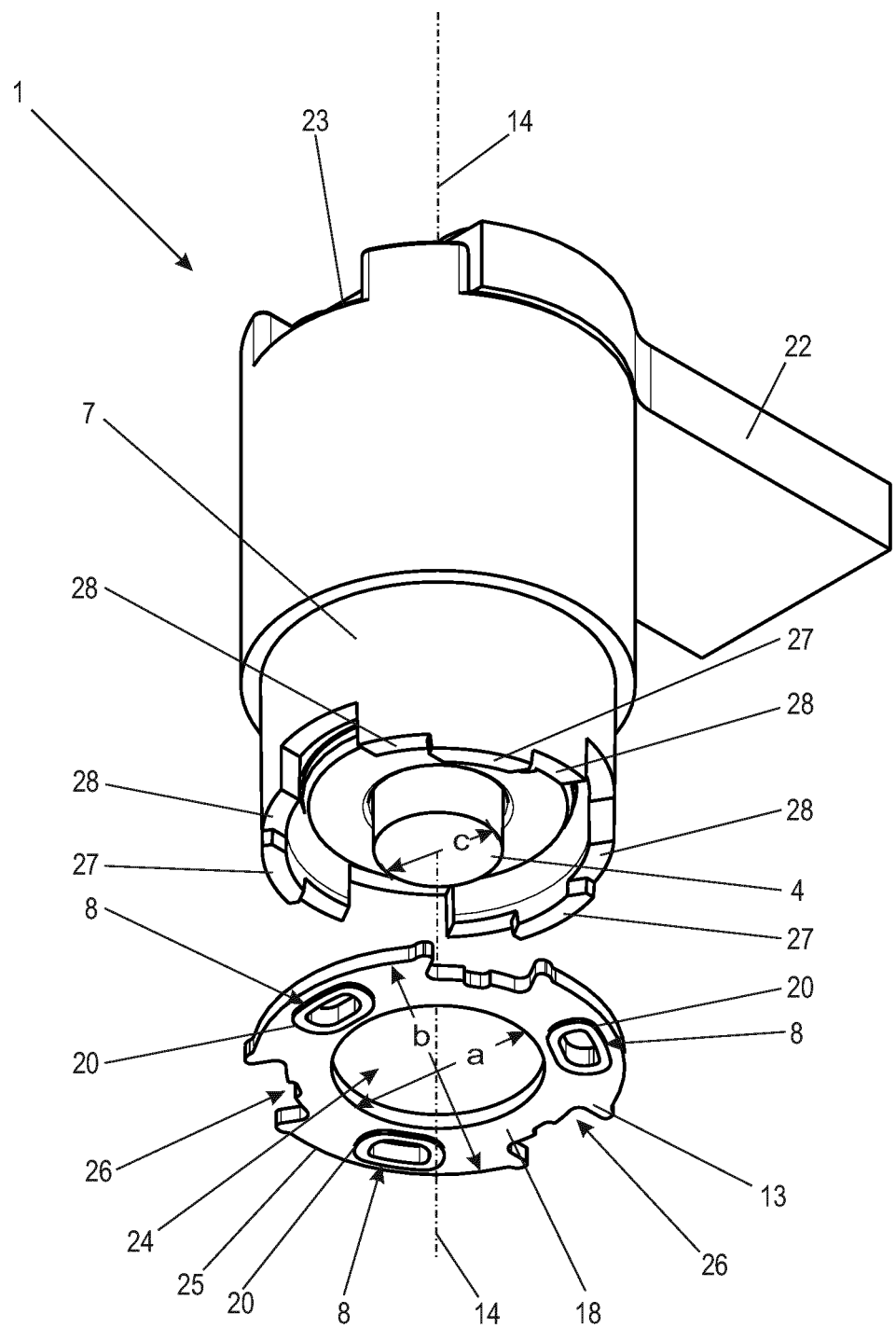
FIG. 2 a perspective illustration of the electromagnetic valve according to FIG. 1 with separate valve component embodied as a ring element.

In FIGS. 1 and 2, an embodiment of an electromagnetic valve 1 is illustrated. The electromagnetic valve 1 comprises an electric drive coil 3 (FIG. 4) in which a magnetic inner core 4 is arranged. The electromagnetic valve 1 comprises a longitudinal center axis 14. The longitudinal center axis 14 extends centrally through the magnetic inner core 4 along its longitudinal direction. The inner core 4 is preferably embodied as one piece together with a hollow cylindrical outer core 7 that surrounds the electrical drive coil 3 and forms together therewith a magnetic yoke 11. The yoke 11 has a cup-shaped basic form. The inner core 4 is connected by a magnetic bottom section 23 with the magnetic outer core 7. At the bottom section 23, on the side which is facing away from the inner core 4, an electric connecting plug 22 is arranged. By means of the electric connecting plug 22, the electromagnetic valve 1 can be connected to an electric circuit and supplied with current.

As shown in the embodiment according to FIGS. 1 and 2, at the side of the yoke 11 facing away from the bottom section 23, a valve component 18 is arranged which is embodied as a ring element 10. The ring element 10 has a first end face 12 (FIG. 4) which is positioned to face the bottom section 23 of the yoke 11. The ring element 10 comprises a second end face 13 which is facing away from the bottom section 23 of the yoke 11. The valve component 18 is embodied substantially in a circular disc shape as a ring element 10 and comprises advantageously a central opening 24 concentrically embodied relative to the longitudinal center axis 14. The ring element 10 has an inner diameter a which corresponds to the diameter of the inner opening 24 of the ring element 10. The ring element 10 has moreover an outer diameter b which substantially corresponds to the outer diameter of the ring element 10. The outer diameter b of the ring element 10 is larger than the inner diameter a of the ring element 10. The inner core 4 of the yoke 11 has a diameter c. In advantageous embodiment, the outer diameter b is at least 1.5 times as large as the inner diameter a. In the illustrated advantageous embodiment, the inner diameter a is at least 1.25 times, preferably at least 1.5 times, as large as the diameter c of the inner core 4.

In FIGS. 1 and 2, it is shown that the ring element 10 has an outer rim 25. In the rim 25, cutouts 26 are formed at an angular spacing of preferably approximately 120°. At the side of the yoke 11 which is facing away from the bottom section 23, the contact surfaces 28 and projections 27 are formed. Preferably, the projections 27 in circumferential direction of the outer core 7 are positioned at an angular spacing of 120° relative to each other. The ring element 10 is advantageously arranged at the yoke 11 such that the projections 27 of the outer core 7 engage the cutouts 26 of the ring element 10 and the contact surfaces 28 of the outer core 7 contact the first end face 12 of the ring element 10. In this way, the ring element 10 is connected with form fit to the outer core 7 of the yoke 11. The ring element 10 is secured with form fit against a rotation about the longitudinal axis 14 relative to the yoke 11. The ring element 10 is secured in circumferential direction relative to the longitudinal center axis 14 with form fit and axially by friction relative to the longitudinal center axis 14.

In an advantageous embodiment, the second end face 13 of the ring element 10 and the end face of the projection 27 are positioned in a common plane. The longitudinal axis 14 is positioned perpendicular to this plane. The ring element 10 comprises at least one nose 31 (FIG. 1). In the embodiment, two noses 31 are formed at each cutout 26, respectively, at the outer rim 25 of the ring element 10. The ring element 10 comprises at least six noses 31 which secure the ring element 10 in the direction of the longitudinal center axis 14 in the injection-molded state in the valve housing 2.

As illustrated in FIG. 1, the inner core 4 ends with its end face facing away from the bottom section 23 in the direction of the longitudinal center axis 14 between a plane in which the first end face 12 of the ring element 10 is positioned and a plane in which the second end face 13 of the ring element 10 is positioned.

In FIGS. 1 and 2, it is shown that the ring element 10 has three valve seats 8 and three valve openings 29. Each valve opening 29, embodied as a flow opening, is surrounded by a valve seat 8. Each valve seat 8 comprises a circumferentially extending raised rim 20 which forms a sealing seat. In an advantageous embodiment, in operation of the electromagnetic valve 1, a fluid to be controlled, in particular a fuel, can flow through the valve openings 29. In order to change the flow cross section, the number of valve openings 29 can be adjusted. Thus, in an advantageous embodiment, the ring element 10 comprises at least one valve opening 29, in particular at least two valve openings 29, preferably at least three valve openings 29. Expediently, the ring element 10 can also be provided with four or more valve openings 29.

At the second end face 13 of the ring element 10, the valve seat 8 of a valve opening 29 is formed by a circumferentially extending rim 20. The rim 20, raised relative to the end face 13, forms a sealing seat of the valve seat 8. The raised rim 20 can also be referred to as a shoulder. The raised rim 20 extends, beginning at the second end face 13 of the ring element 10, in a direction parallel to the longitudinal center axis 14. The sealing seat which is formed at the rim 20 is positioned in a plane which is perpendicular to the longitudinal center axis 14.

Various materials or material combinations can be used for the ring element 10. In the embodiment, the ring element 10 is comprised of a magnetic metal, in particular a magnetic steel alloy. It can be expedient to embody the ring element 10 of an non-magnetic metal, in particular of a non-magnetic steel alloy, preferably of a stainless steel.

As illustrated in FIG. 1, cutouts are provided at the yoke 11 at its side facing away from the bottom section 23 and form openings 30 between the ring element 10 and the yoke 11. A fluid can flow through the openings 30 of the yoke 11 to the valve openings 29 of the ring element 10. The number of openings 30 which are provided at the yoke 11 corresponds preferably to the number of valve openings 29 of the ring element 10.

Figure 3:
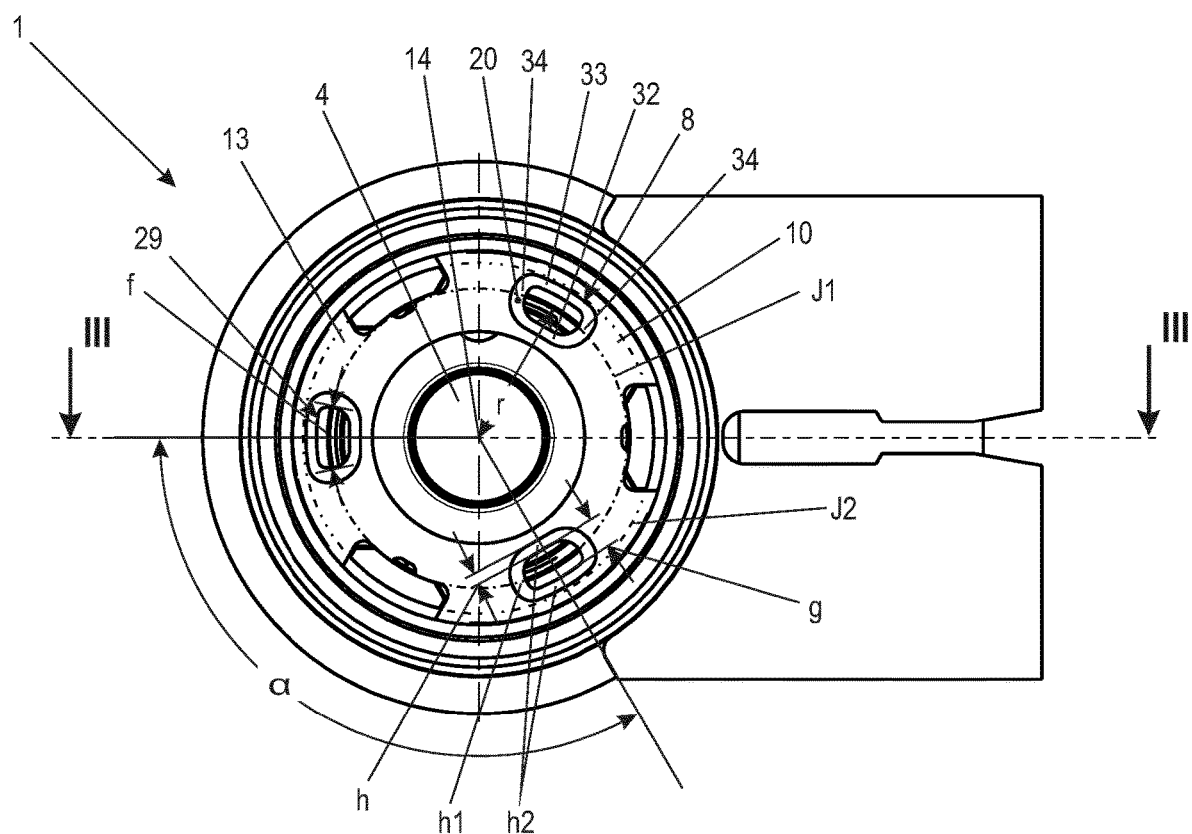
FIG. 3 a view of the electromagnetic valve with valve housing from below without plate armature.

As illustrated in FIG. 3, the valve openings 29 of the ring element 10 are arranged symmetrical to each other about the longitudinal axis 14. In the embodiment, the three valve openings 29 have the same angular spacing a of 120° relative to each other in circumferential direction. Expediently, also a non-uniform angular spacing a of the valve openings 29 relative to each other is possible.

In plan view, which corresponds to a viewing direction perpendicular to the second end face 13 of the ring element 10, a valve opening 29 comprises an approximately rectangular to oval basic shape. In this way, a valve opening 29 can have a maximum length f measured in circumferential direction of the longitudinal axis 14 and a maximum width g measured in radial direction relative to the longitudinal center axis 14. The length f of the valve opening 29 is preferably greater than the width g of the valve opening 29. In an advantageous embodiment, the length f of the valve opening 29 corresponds at least to twice the width g of the valve opening 29.

The sealing seat of a valve seat 8 extends about the valve opening 29 and comprises a width h which is measured radially relative to the center point of the surface of the valve opening 29. The valve opening 29 comprises an inner longitudinal side 32 and an outer longitudinal side 33, which extend in circumferential direction of the longitudinal center axis 14, as well as two transverse sides 34 which extend in radial direction of the longitudinal center axis 14. The transverse sides 34 connect the inner longitudinal side 32 and the outer longitudinal side 33 to each other. In an advantageous embodiment, the valve openings 29 can also be round, in particular circular.

In an advantageous embodiment, the widths $h_1$ of the valve seat 8 at the transverse sides 34 of the valve openings 29 are greater than the width $h_2$ of the valve seat 8 at the longitudinal sides 32, 33 of the valve opening 29.

The radius of the valve opening 29 at the transition between the transverse side 34 and the inner longitudinal side 32 is larger than the radius at the transitions between the transverse sides 34 and the outer longitudinal side 33. In an advantageous embodiment, the valve opening 29, for example, in order to promote the fluid flow, can also have other basic shapes, in particular an elliptical shape.

Figure 4:
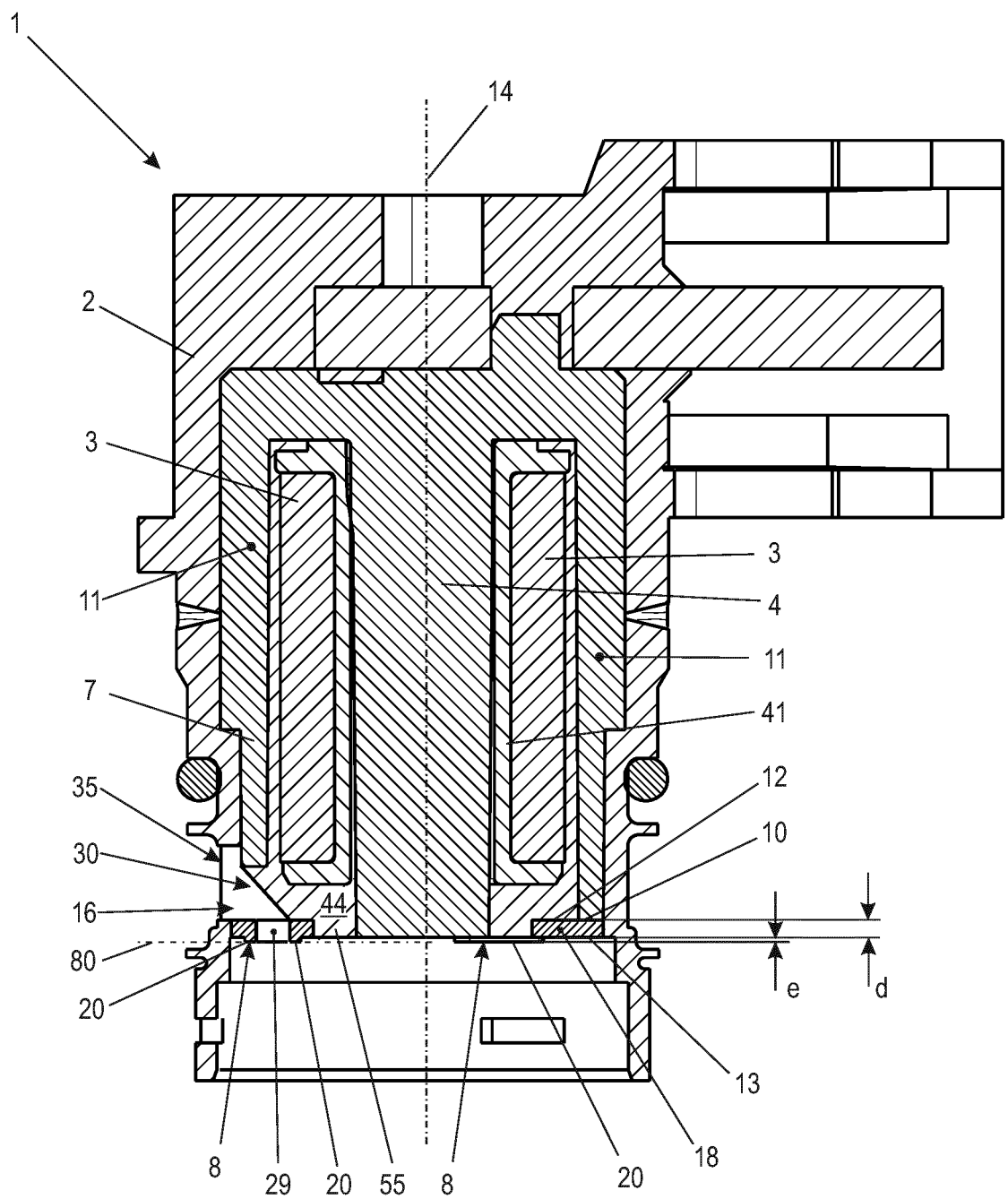
FIG. 4 a section illustration along the line III-III of FIG. 3 of the electromagnetic valve.

As illustrated in FIG. 4, the electrical drive coil 3, the yoke 11 with the inner core 4 and the outer core 7 as well as the ring element 10 as the valve component 18 are embedded by casting, in particular by injection molding, in the valve housing 2 comprised of plastic material. The plastic material of the valve housing 2 is comprised advantageously of polyvinylidene fluoride (PVDF). The electromagnetic valve 1 comprises at least a first flow channel 16. The first flow channel 16 extends, beginning at a housing opening 35, all the way to the valve opening 29. The housing opening 35 is positioned in the outer side of the valve housing 2. The first flow channel 16 extends expediently via the opening 30 of the yoke 11 all the way to the valve opening 29 of the ring element 10. The number of housing openings 35 as well as the number of flow channels 16 corresponds preferably to the number of valve openings 29 of the ring element 10.

As shown in FIG. 4, the height e of the rim 20 correspond to the spacing measured in the direction of the longitudinal axis 14 between the second end face 13 of the ring element 10 and the sealing seat of the valve seat 8. The height d of the ring element 10 corresponds to the spacing d between the first end face 12 and the second end face 13 of the ring element 10 measured in the direction of the longitudinal center axis 14. In the embodiment, the height e of the rim 20 is smaller than the height d of the ring element 10. In an advantageous embodiment, the height d of the ring element 10 corresponds to at least 3 times, in particular at least 5 times, the height e of the shoulder 20. The width h of the valve seat 8 (FIG. 3) is greater than the height e of the shoulder 20. In advantageous embodiment, the width b correspond to at least 3 times the height e of the shoulder 20. In an advantageous embodiment, the end face of the inner core 4 which is facing away from the bottom section 23 is positioned in a plane which is positioned between the second end face 13 of the ring element 10 and the sealing seat of the valve seat 8 of the ring element 10.

Figure 5:
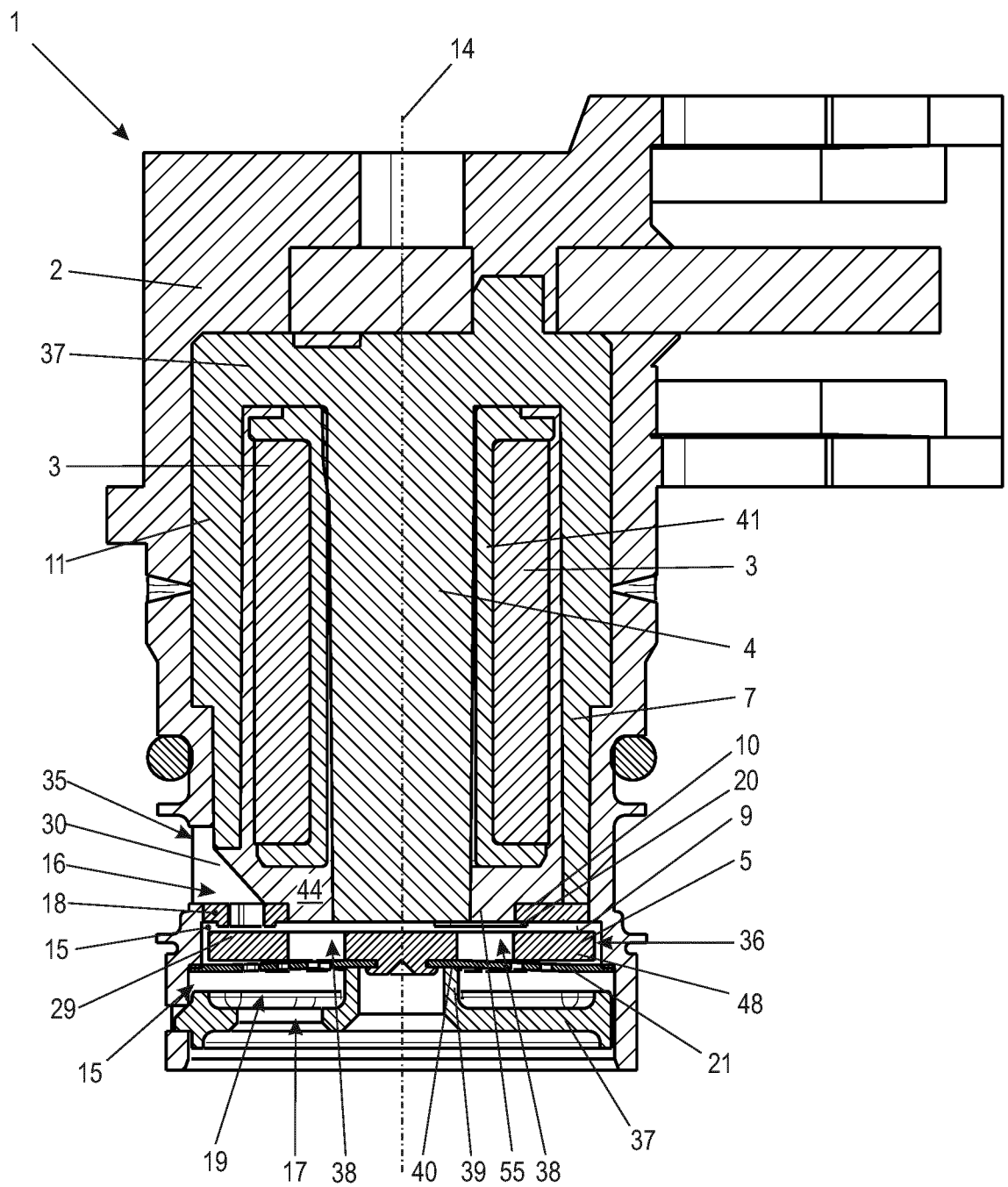
FIG. 5 a section illustration along the line III-III in FIG. 3 of an electromagnetic valve with valve housing in a first switching position.

In FIG. 5, the electromagnetic valve 1 is shown in a first switching position. At the side of the yoke 11 which is facing away from the bottom section 23 of the yoke 11, a metallic plate armature 5 is arranged. The plate armature 5 is movably supported in the direction of the longitudinal center axis 14 in the valve housing 2. The plate armature 5 is comprised of an armature disc 48 which is embodied as a circular disc and a valve spring 21 embodied as a thin disc spring is acting on it. The valve spring 21 is concentrically held relative to the longitudinal center axis 14 in the valve housing 2. Between the valve housing 2 and the plate armature 5, an annular gap 36 is formed, preferably in the region of the circumference of the armature disc 48. In the armature disc 48 of the plate armature 5, at least one flow opening 38 is provided whose opening axis extends parallel to the longitudinal center axis 14. Advantageously, the armature disc 48 of the plate armature 5 comprises a plurality of flow openings 38 which are arranged symmetrical in circumferential direction relative to the longitudinal center axis 14. In an advantageous embodiment, also a non-symmetric arrangement of the flow openings 38 about the longitudinal center axis 14 is possible.

As shown in FIG. 5, the valve spring 21 comprises an outer circumference and an inner circumference. The valve spring 21 is fixedly fastened at its outer circumference to the valve housing 2 and at its inner circumference to the armature disc 48 of the plate armature 5. The valve spring 21 comprises flow openings. Preferably, the valve spring 21 is embodied as a flat spring with meandering bending arms. The use of other valve springs may be expedient also.

As shown in FIG. 5, the electromagnetic valve 1 comprises a valve cover 37 which is inserted into the open end face of the valve housing 2. The valve cover 37 is arranged in the valve housing 2 at the side of the plate armature 5 which is facing away from the bottom section 23 of the yoke 11. The valve cover 37 is preferably connected with form fit to the valve housing 2. In advantageous embodiment, a different connection between valve cover 37 and valve housing 2 can be expedient also. At the center of the valve cover 37, a cylinder 39 is formed which is concentrically arranged relative to the longitudinal center axis 14. At the cylinder 39, a contact surface 40 is embodied against which the valve spring 21 is resting in the first switching position of the electromagnetic valve 1.

The electromagnetic valve 1 assumes switching positions in order to control the flow of the fluid:

When the operating current is switched off, the electric drive coil 3 is currentless; the electromagnetic valve 1 is in the first switching position (FIG. 5). The valve spring 21 is contacting the support surface 40 of the cylinder 39 of the valve cover 37. The valve spring determines in this way the position of the plate armature 5 in which a sealing surface 9 of the armature disc 48 of the plate armature 5 is not contacting the valve seat 8 of the ring element 10. The valve openings 29 are open. The fluid can flow through housing opening 35 and the first flow channel 16, the opening 30, and through the valve opening 29 of the ring element 10 into a valve chamber 15. The valve chamber 15 is formed in the valve housing 2.

From the valve chamber 15, the fluid flows through the flow openings 38 of the armature disc 48 of the plate armature 5 and further through the annular gap 36 between the armature disc 48 and the valve housing 2 in order to flow through the openings of the valve spring 21 to the valve cover 37. Through at least one opening 19 in the valve cover 37, the fluid flows through at least a second flow channel 17 to the valve outlet. The second flow channel 17 is advantageously embodied in the valve cover 37. The at least one second flow channel 17 extends advantageously parallel to the longitudinal center axis 14 of the electromagnetic valve 1. Expediently, the number of openings 19 as well as of the second flow channels 17 of the valve cover 37 corresponds to the number of valve openings 29 of the ring element 10 in order to obtain an almost constant flow cross section across the entire course of flow of the fluid through the electromagnetic valve 1.

Figure 6:
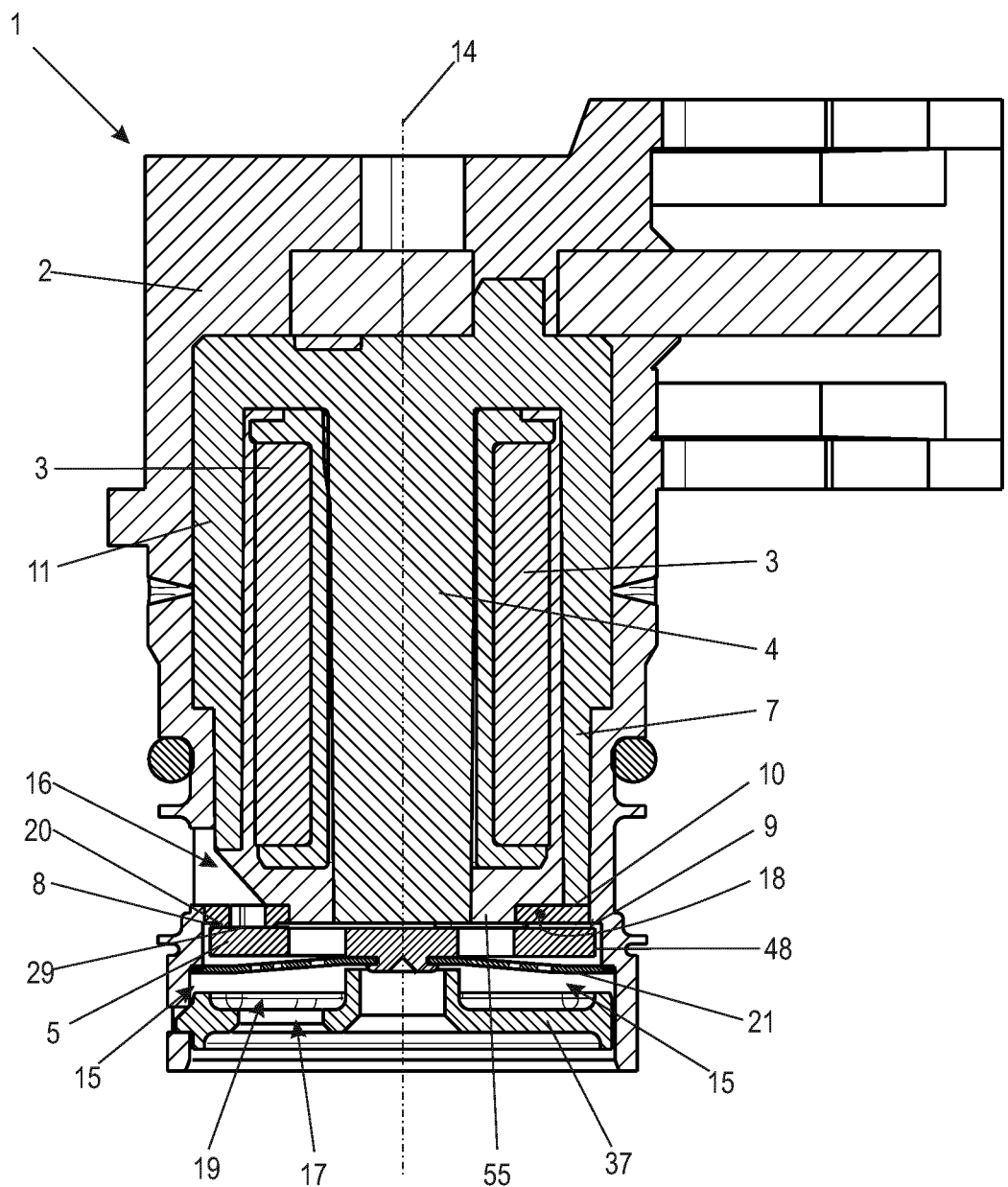
FIG. 6 a section illustration along the line III-III of FIG. 3 of the electromagnetic valve with valve housing in a second switching position.

When the operating current is switched on, a current is flowing in the electric drive coil 3 so that an electromagnetic field is generated which switches the electromagnetic valve 1 into the second switching position illustrated in FIG. 6. The armature disc 48 of the plate armature 5 is attracted by the yoke 11 against the spring force of the valve spring 21 so that the sealing surface 9 of the armature disc 48 contacts seal-tightly the valve seats 8 of the ring element 10. The armature disc 48 of the plate armature 5 closes off the valve openings 29 of the ring element 10. The flow of fluid into the valve chamber 15 is blocked.

Figure 7:
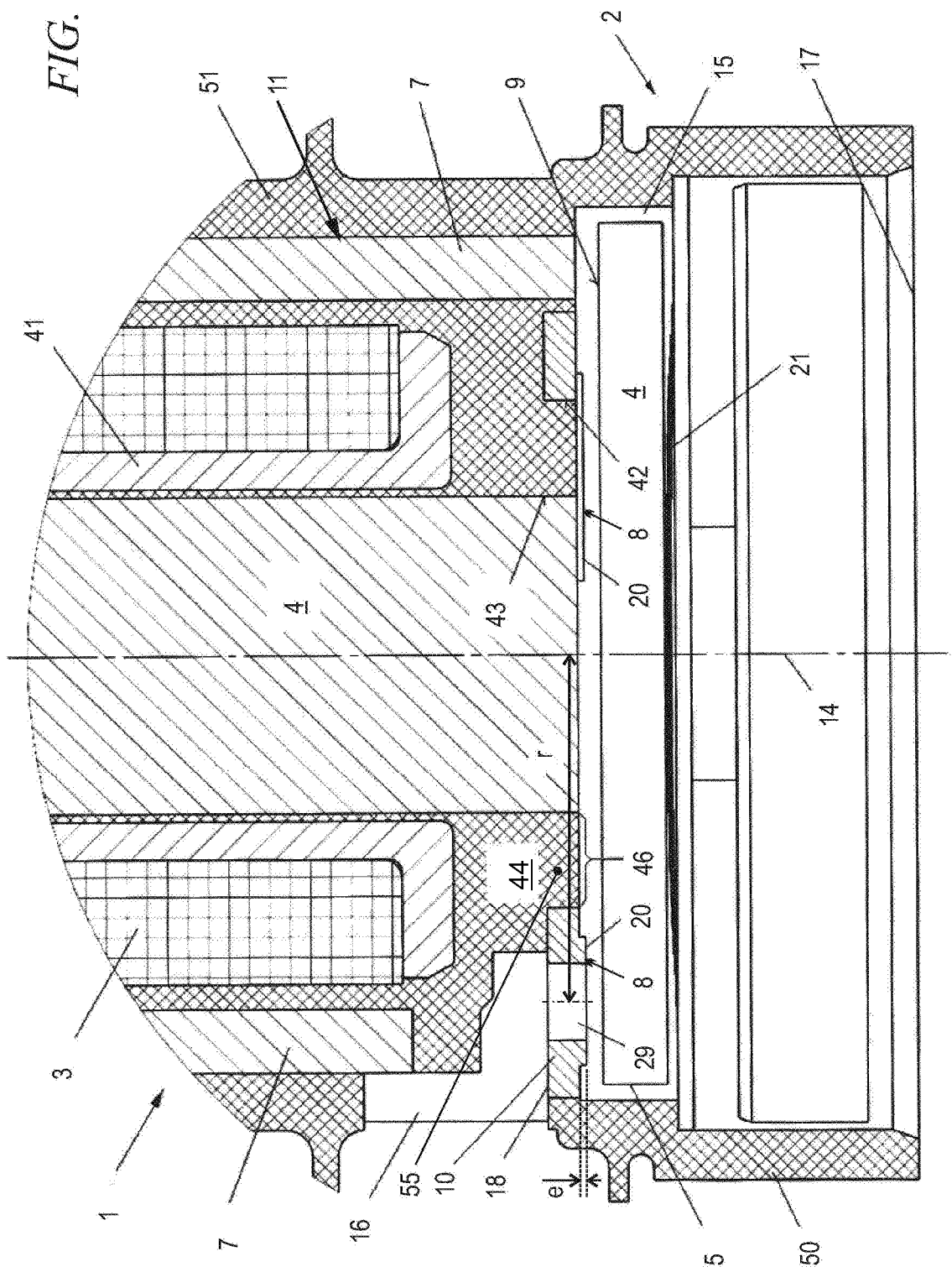
FIG. 7 a further section illustration of the electromagnetic valve according to the invention.

The electromagnetic valve 1 illustrated in section in FIG. 7 is provided for gaseous and liquid media. It is embodied relative to its longitudinal center axis 14 as a substantially circular cylindrical body and comprises a valve housing 2 comprised of plastic material as well as an electric drive coil 3 for an electromagnetic valve actuation. In the valve housing 2, a valve chamber 15 is embodied which is delimited also by a circumferential wall 50, formed of plastic material, of the valve housing 2. The bottom side of the valve housing 2 in FIG. 7 is open. The open side forms an outlet for the medium provided as a second flow channel 17.

In the valve chamber 15, there is an axially displaceable plate armature 5. The plate armature 5 is comprised advantageously of a metallic armature disc 48 coaxially positioned relative to the longitudinal center axis 14 and a thin spring disc which forms a valve spring 21. The armature disc 48 can be penetrated by one or a plurality of through bores. The armature disc 48 and the disc spring provided as a valve spring 21 can be combined expediently to a structural unit. The armature disc 48 is provided at the top side, which is facing away from the disc spring or the valve spring 21, with a planar sealing surface 9 which is in particular embodied to have a high strength against wear.

The top part of the valve chamber 15 in FIG. 7 is substantially delimited by a magnet head. The magnet head comprises a magnetic yoke 11 which comprises a round rod-shaped inner core 4 and a tubular outer core 7 with a larger diameter, which are arranged coaxially to the longitudinal center axis 14. In the annular space between the inner core 4 and the outer core 7, preferably also coaxially to the longitudinal center axis 14, the electric drive coil 3 is provided which is arranged on a coil carrier 41.

The magnet head is enclosed by an outer wall 51 which is comprised of plastic material like the circumferential wall 50 of the valve housing 2 and is embodied preferably together with the latter as a one-piece component of the same material.

At the bottom side of the magnet head which is facing the plate armature 5, a valve component 18 is arranged coaxially to the longitudinal center axis 14. The valve component 18 is manufactured, preferably of the same material and as one piece of a metal, to have a basic disc, embodied in particular as a ring element 10, and at least one valve seat 8. The valve component 18 comprised of the ring element 10 and at least one valve seat 8 is expediently embodied as a structural component produced by a stamping/bending method. Preferably, the valve component 18 is comprised of a magnetizable metal. The valve component 18 can be embodied in particular as an insertion part which is embedded by casting in the material of the valve housing 2.

In the basic disc or the ring element 10 of the valve component 18, at least one flow hole as valve opening 29 for the medium is formed. FIG. 7 shows that the valve seat 8 is embodied as a raised metal rim 20 which delimits the valve opening 29 circumferentially. The metal rim projects past the plane of the basic disc or ring element 10 by a measure e at the side which is facing the plate armature 5.

In a preferred embodiment, the basic disc which is embodied as ring element 10 of the valve component 18 can comprise three valve openings 29 with three correlated valve seats 8 which relative to the longitudinal center axis 14 are arranged in a circle at uniform 120° angular spacings. Moreover, it can be advantageous to embody the valve openings 29 as somewhat bent elongate rectangular holes in part-circular shape and to adapt the valve seats 8 to the rim configuration of the valve openings 29. In this context, it can also be advantageous to provide the corner regions of the rectangular valve openings 29 with a radius and to thus make them rounded.

Also, the valve component 18 comprises a centrally formed through hole in the basic disc whose diameter is larger than the diameter of the inner core 4 so that between the boundary wall 42 of the through hole and the circumferential surface 43 of the inner core 4 an annular spacing 46 is formed. The valve component 18 itself is fastened to the inner core of the magnet head. The fastening is realized preferably such that at least a portion of the circumferential outer surface of the basic disc or of the ring element 10 is positioned stationarily at the inner surface of the tubular wall of the outer core 7. In this context, the circumferential surface of the ring element 10 or of the basic disc can be secured expediently by means of press fit at the inner surface of the outer core 7.

The basic disc of the valve component 18 which is embodied as a ring element 10 is embedded as an insertion part with form fit in the plastic component 44 of the valve housing 2 so that a hermetically sealed closure of the magnetic yoke 11 relative to the valve chamber 15 is formed. The valve seat 8 itself is not embedded in plastic material or coated with plastic material but in particular is metallic and exposed. Accordingly, the planar sealing rim of the valve seat 8, when the plate armature 5 is attracted, is immediately contacting seal-tightly the planar sealing surface 9 of the armature disc 48. The plastic material 44 fills the spacing 46 between the boundary wall 42 of the ring element 10 and the circumferential surface 43 of the inner core 4 in particular completely. The basic disc, which is embodied as ring element 10, and the inner core 4 are magnetically separated by the plastic material 44 as a non-magnetizable material. The employed plastic material 44 for the valve housing 2 as well as for embedding the electric drive coil 3 and the valve component 18 as well as filling the spacing 46 can be expediently the same material. FIG. 7 shows that the end face of the plastic material 44, which fills the spacing 46 and is facing the plate armature 5, and the end face of the inner core 4 preferably are positioned in a common plane which is slightly recessed relative to the sealing metal rim 20 of the valve seat 8.

For the supply of the medium, a first flow channel 16 is formed immediately above the valve seat 8 of the valve component 18, at the left side in FIG. 7, so that the medium can flow through the valve opening 29 into the valve chamber 15 along the shortest path. Advantageously, the valve 1 has three supplying flow channels 16 which are each correlated with a valve seat 8 and are arranged relative to each other at uniform 120° angular spacings in circumferential direction relative to the longitudinal center axis 14.

The described valve 1 has the advantage of minimal wear and a permanent high operational reliability. A further advantage resides in that by means of the valve component 18 produced of magnetizable material the magnetic circuit is positively affected and the magnetic attraction acting on the plate armature 5 is reinforced so that a high valve seat seal-tightness is ensured.

In an alternative embodiment, the electromagnetic valve 1 can comprise a valve component 18 such as the ring element 10 with only a single valve seat 8. Instead of a central opening 24 in the valve component 18, the valve seat 8 can be arranged centrally in the valve component 18. The valve opening 29 of the valve seat 8 is then arranged approximately coaxial to the longitudinal center axis 14.

In an alternative embodiment, not illustrated in the Figures, the electromagnetic valve can also be embodied as a valve that is closed when currentless. A valve component in the form of a ring element can be arranged in the valve housing between the metallic plate armature and the valve cover. Preferably, the valve component is held in the valve cover, preferably, embedded by casting therein, in particular by injection molding. Advantageously, the valve component comprises a central valve seat which is arranged in place of the inner opening centrally in the ring element. The valve opening of the valve seat is arranged coaxially to the longitudinal center axis and opens in the cylinder of the valve cover. The first flow channel of the valve extends through the valve cover. When the electric drive coil is energized, the metallic armature disc 48 of the plate armature is pulled against the yoke and opens the valve seat. The fluid can flow via the first flow channel through the valve cover into the second flow channel which is comprised of the central valve opening of the valve seat as well as the central cylinder of the valve cover. When the electric drive coil is currentless, the armature disc 48 of the plate armature is pushed by the valve spring against the central valve seat. The flow connection between the first flow channel and the second flow channel is interrupted. Advantageously, the valve cover can also comprise additional and/or other flow channels.

Figure 8:
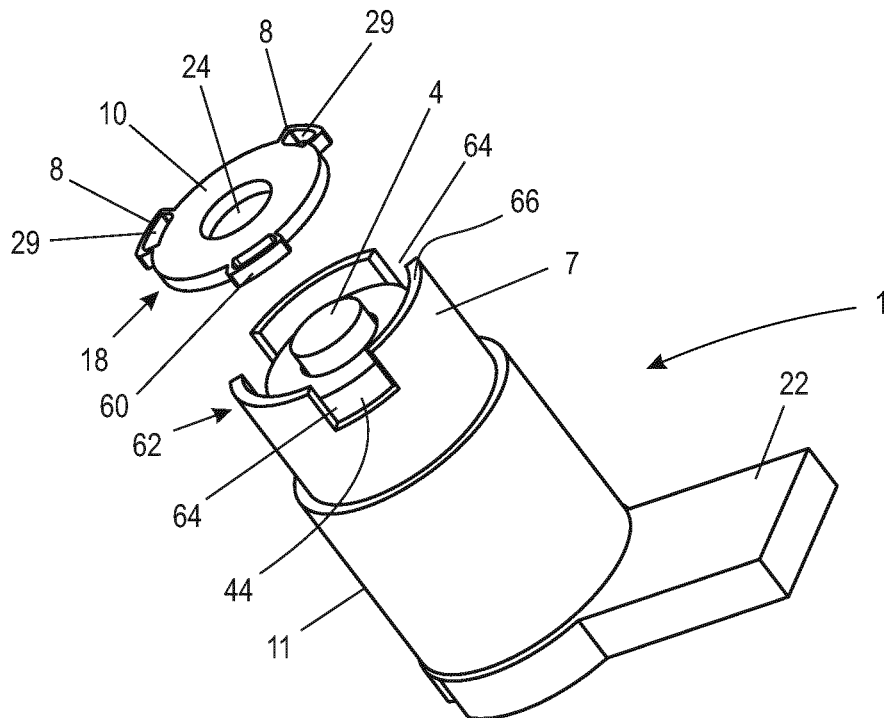
FIG. 8 in perspective illustration the drive unit of an electromagnetic valve with a valve component embodied as a ring element before mounting at the yoke of the drive unit.
Figure 9:
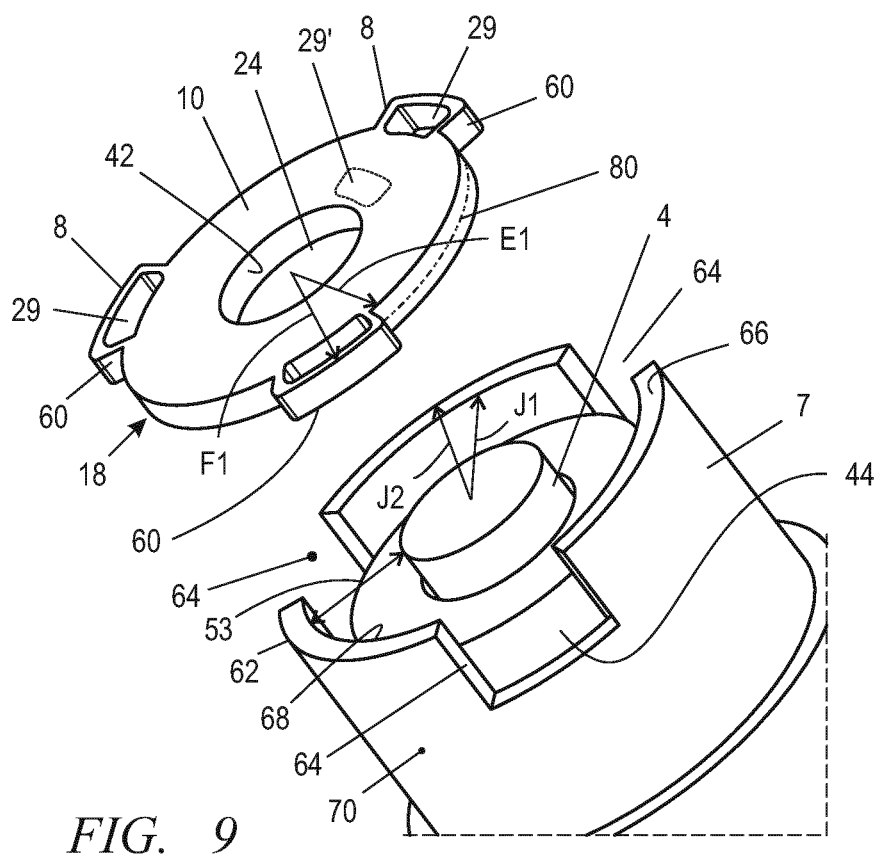
FIG. 9 in enlarged perspective illustration the valve component according to FIG. 8 embodied as a ring element prior to its mounting at the yoke of the drive unit.
Figure 10:
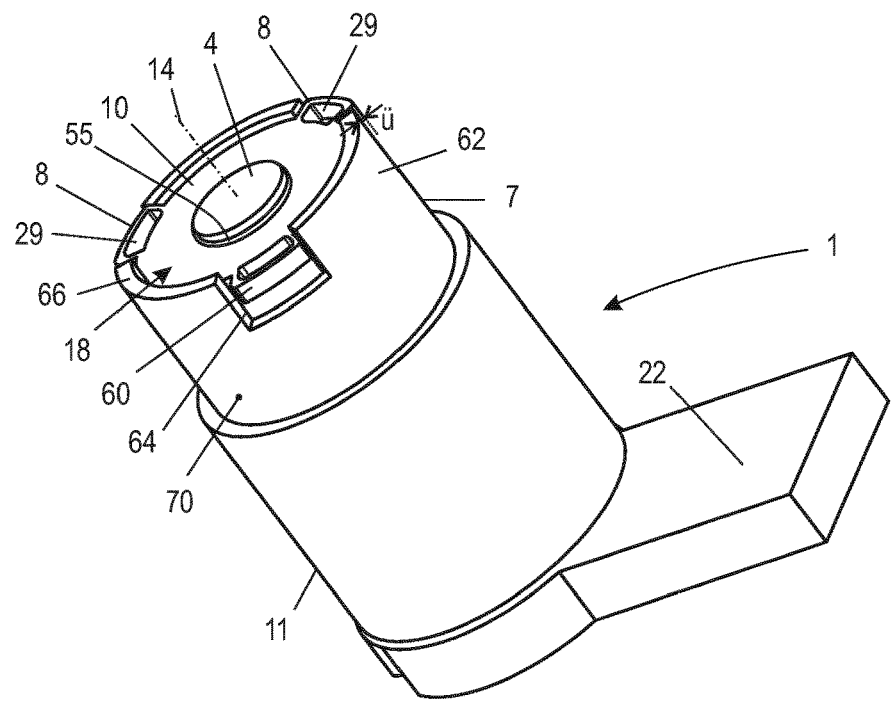
FIG. 10 in perspective illustration the drive unit of the electromagnetic valve according to FIG. 8 with a valve component embodied as a ring element mounted at the yoke.

In the embodiment of an electromagnetic valve 1 according to FIGS. 8 to 10, the valve component 18 is embodied as a ring element 10. Valve openings 29 are embodied in the ring element 10. Advantageously, valve seats 8 are formed on the ring element 10.

The ring element 10 comprises, as shown in particular in FIGS. 8 and 9, a central opening 24. The inner diameter a (FIG. 2) of the central opening 24 is advantageously larger, in particular slightly larger, than the inner diameter c (FIG. 2) of the cylindrical inner core 4.

The ring element 10 comprises in the embodiment according to FIGS. 8 to 10 at least one in particular radial fastening section 60. The at least one fastening section 60 projects radially past the outer diameter E1 (FIG. 9) of the ring element 10. Preferably, the ring element 10 comprises three fastening sections 60. The at least one fastening section 60 ends advantageously at an outer flange diameter F1. As shown in an exemplary fashion in FIGS. 8 and 9, the valve openings 29 are formed in the fastening sections 60. The valve seats 8 can be embodied as raised rim of the valve opening 29.

In the embodiment according to FIGS. 8 and 9, the outer core 7 has cutouts 64. The outer core 7 is advantageously embodied as an outer cylinder. The outer core 7 of the magnet yoke 11 comprises cutouts 64 advantageously at the end which is facing the valve component 18. The cutouts 64 are open preferably relative to the end face 66 of the outer core 7.

The inner core 4 is advantageously embodied as a cylindrical solid rod. The circumferential surface 43 of the inner core 4 comprises expediently a spacing 53 relative to the inner wall 68 of the outer cylinder of the outer core 7. Due to the provided spacing 53, an annular space is formed so that between these two components an air gap is formed, for example. The annular space between the circumferential surface 43 of the inner core 4 and the inner wall 68 of the outer core 7 is advantageously filled with a non-magnetic material, in particular with plastic material 44.

As shown in FIG. 10, the valve component 18 embodied as a ring element 10 is received in the annular space between the inner core 4 and the inner wall 68 of the outer core 7. The valve component 18 is contacting advantageously the plastic material 44. The valve component 18 is in particular embedded as an insertion part in the plastic material 44, in particular by casting. In the mounted state of the valve component 18 according to FIG. 10, the fastening section 60 are positioned in the cutouts 64 of the outer core 7. The inner boundary wall 42 of the inner opening 24 is advantageously positioned in the mounted state at a spacing to the circumferential surface 43 of the inner core 4. In this way, an air gap 55 between the valve component 18 and the inner core 4 is provided. This is apparent in particular also from the schematic section illustrations of FIGS. 4 to 7.

Due to the arrangement of the valve openings 29 in the fastening sections 60, the valve openings 29 at least partially are positioned within the cutouts 64.

Advantageously, the fastening sections 60 can project with a projecting length radially past the outer circumferential surface 70 of the outer core 7. Due to the engagement of the valve component 18 in at least one cutout 64 of the outer core 7, a form-fit connection between the magnetic yoke 11 and the valve component 18 is achieved in circumferential direction of the longitudinal center axis 14. Moreover, the valve component 18 becomes part of the magnetic circuit of the yoke 11.

As also illustrated in FIG. 3, the outer cylinder has an inner diameter J1 of the inner wall 68 as well as an outer diameter J2 of the circumferential surface 70. As can be seen schematically in FIG. 3, the valve openings 29 advantageously are positioned on the inner diameter J1 of the outer core 7. The valve seat 8 of a valve opening 29 in plan view according to FIG. 3 can adjoin the outer diameter J2 of the circumferential surface of the outer core 7. Preferably, the outer width h2 of the valve seat 8 is positioned on the diameter circle or projects past it, as shown in FIG. 10.

As an alternative to an embodiment according to FIGS. 8 to 10, the at least one valve opening 29' (FIG. 9), preferably three valve openings, in the valve component 18 can also be displaced inwardly toward the opening 24, i.e., arranged in the direction toward the inner core 4. In such an embodiment, the valve openings are also preferably positioned in a common plane 80.

Figure 11:
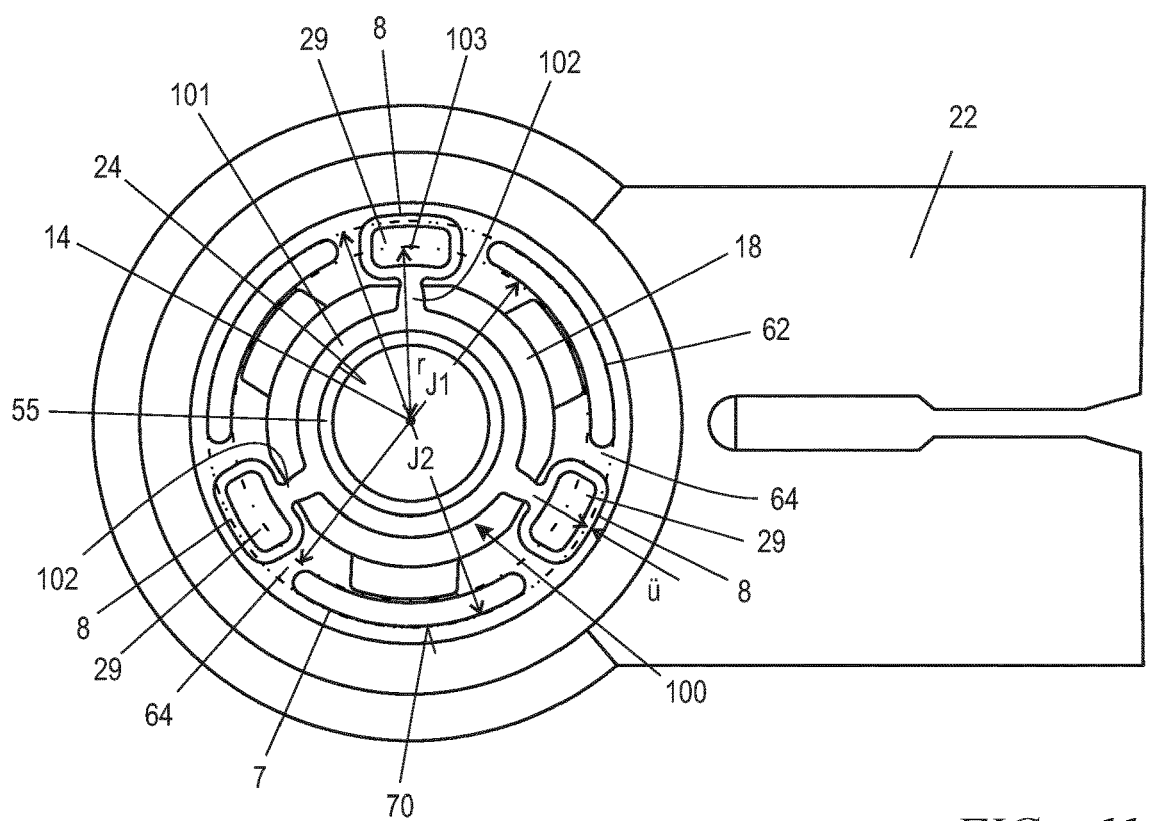
FIG. 11 a plan view of the valve seats embodied as a frame of a valve according to the invention in a further embodiment.

In the embodiment according to FIG. 11, the valve component 18 is embodied as a frame element 100. An inner circular ring 101 comprises the inner opening 24 and supports at least one valve seat 8 on at least one radial web 102. In the embodiment according to FIG. 11, three valve seats 8 are provided that are positioned in a common plane. At least one of the valve seats 8 is advantageously arranged in a cutout 64 of the outer core 7. Particularly preferred, all valve seats 8 are arranged in a respective cutout 64 of the outer core 7. In circumferential direction about the longitudinal center axis 14, the cutouts 64 are embodied wider than a valve seat 8. The position within the cutout is advantageously provided such that a center 103 of a valve seat 8 is positioned on an inner diameter circle J1 of the outer core 7.

As shown in FIG. 11, the valve seats 8 project with a length u past the outer circumferential surface 70 of the outer core 7. The circular ring 101 with the radial webs 102 securing the valve seats 8 are advantageously formed as one piece of metal or a metal alloy. In this context, the frame element 100 forming the valve component 18 can be stamped, cast or etched.

Further advantageous embodiments result from any suitable combination of the features of the embodiments described above.

What is claimed is:

1. An electromagnetic valve comprising:
   a valve housing;
   a valve component disposed in the valve housing and comprising at least one valve opening provided with a valve seat;
   wherein the valve component and the valve seat are formed of the same metal as a one-piece metal part, wherein the one-piece metal part is a ring element, wherein the ring element comprises a central opening and is arranged coaxial to a longitudinal center axis of the electromagnetic valve;
   wherein the at least one valve opening is embodied in the ring element and is surrounded by the valve seat, wherein the at least one valve opening is positioned at a radial spacing relative to the longitudinal center axis of the electromagnetic valve;
   a magnetic circuit comprising an electric drive coil and a magnetic yoke;
   a metallic plate armature comprising an armature disc interacting with the magnetic yoke, wherein the armature disc is movably supported relative to the magnetic yoke and comprises a sealing surface;
   wherein the armature disc contacts seal-tightly with the sealing surface the valve seat in a first switching position of the electromagnetic valve and opens the valve seat in a second switching position of the electromagnetic valve;
   wherein the valve seat which contacts directly the sealing surface of the armature disc is comprised of metal.

2. The electromagnetic valve according to claim 1, wherein the valve seat is a raised rim of the at least one valve opening formed at the ring element.

3. The electromagnetic valve according to claim 1, wherein the valve component is a frame element comprising at least one metal frame that frames the at least one valve opening and forms the valve seat.

4. The electromagnetic valve according to claim 1, wherein the valve component is joined directly form-fittingly to the magnetic yoke.

5. The electromagnetic valve according to claim 1, wherein the valve component is an insertion part embedded by casting in a material of the valve housing.

6. The electromagnetic valve according to claim 1, wherein the valve component is embedded seal-tightly and form-fittingly in a plastic material.

7. The electromagnetic valve according to claim 1, wherein the metal of the one-piece metal part is a magnetizable metal.

8. The electromagnetic valve according to claim 1, wherein the valve component comprises a plurality of said valve seat and the plurality of said valve seat are positioned at a spacing relative to each other in a circumferential direction about the longitudinal center axis of the electromagnetic valve.

9. The electromagnetic valve according to claim 8, wherein the plurality of said valve seat are arranged in a common plane.

10. The electromagnetic valve according to claim 1, wherein the at least one valve opening provided with the valve seat comprises a rectangular shape with rounded corner regions.

11. The electromagnetic valve according to claim 1, wherein the at least one valve opening comprises an opening circumference and wherein the valve seat is arranged all the way around the opening circumference of the at least one valve opening.

12. An electromagnetic valve comprising:
    a valve housing;
    a valve component disposed in the valve housing and comprising at least one valve opening with a valve seat, wherein the at least one valve opening is positioned at a radial spacing relative to a longitudinal center axis of the electromagnetic valve;
    a magnetic circuit comprising an electric drive coil and a magnetic yoke;
    a metallic plate armature comprising an armature disc interacting with the magnetic yoke, wherein the armature disc is movably supported relative to the magnetic yoke and comprises a sealing surface;
    wherein the armature disc contacts seal-tightly with the sealing surface the valve seat in a first switching position of the electromagnetic valve and opens the valve seat in a second switching position of the electromagnetic valve;
    wherein the valve seat which contacts directly the sealing surface of the armature disc is comprised of metal;
    wherein the magnetic yoke is comprised of an outer core and an inner core, wherein the outer core is an outer cylinder comprising a cylinder wall with an inner diameter circle, wherein the at least one valve opening is positioned on the inner diameter circle.

13. An electromagnetic valve comprising:
    a valve housing;
    a valve component disposed in the valve housing and comprising at least one valve opening with a valve seat, wherein the at least one valve opening is positioned at a radial spacing relative to a longitudinal center axis of the electromagnetic valve;

a magnetic circuit comprising an electric drive coil and a magnetic yoke;

a metallic plate armature comprising an armature disc interacting with the magnetic yoke, wherein the armature disc is movably supported relative to the magnetic yoke and comprises a sealing surface;

wherein the armature disc contacts seal-tightly with the sealing surface the valve seat in a first switching position of the electromagnetic valve and opens the valve seat in a second switching position of the electromagnetic valve;

wherein the valve seat which contacts directly the sealing surface of the armature disc is comprised of metal;

wherein the magnetic yoke is comprised of an outer core and of an inner core, wherein the valve component is arranged in an annular space defined between the inner core and a cylinder wall of the outer core, wherein the outer core comprises at least one cutout, and wherein the valve component engages the at least one cutout of the outer core.

14. The electromagnetic valve according to claim 13, wherein the valve component is held rotationally fixed with form fit in the at least one cutout of the outer core, wherein the at least one cutout is provided in the cylinder wall of the outer core.

15. The electromagnetic valve according to claim 13, wherein the at least one valve opening is positioned locally in the at least one cutout of the outer core, wherein the at least one cutout is provided in the cylinder wall of the outer core.

* * * * *